(12) United States Patent
Lesso

(10) Patent No.: US 10,616,701 B2
(45) Date of Patent: Apr. 7, 2020

(54) DETECTION OF LOUDSPEAKER PLAYBACK

(71) Applicant: Cirrus Logic International Semiconductor Ltd., Edinburgh (GB)

(72) Inventor: John Paul Lesso, Edinburgh (GB)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 16/189,372

(22) Filed: Nov. 13, 2018

(65) Prior Publication Data
US 2019/0149932 A1 May 16, 2019

Related U.S. Application Data

(60) Provisional application No. 62/585,660, filed on Nov. 14, 2017.

(30) Foreign Application Priority Data

Feb. 1, 2018 (GB) .................................. 1801659.2

(51) Int. Cl.
*H04R 29/00* (2006.01)
*G10L 25/78* (2013.01)
(Continued)

(52) U.S. Cl.
CPC .......... *H04R 29/001* (2013.01); *G06F 21/32* (2013.01); *G10L 17/00* (2013.01); *G10L 25/51* (2013.01);
(Continued)

(58) Field of Classification Search
CPC .... H04R 29/001; H04R 3/04; H04R 2430/03;
G10L 17/00; G10L 17/08; G10L 25/51;
G10L 25/58; G10L 25/60; G10L 25/78;
G10L 25/69; G10L 17/26; G06F 21/31;
G06F 21/32; G06F 21/55; G06F 21/554
See application file for complete search history.

(56) References Cited

U.S. PATENT DOCUMENTS 6,480,825 B1 * 11/2002 Sharma .............. G07C 9/00158
704/270
7,016,833 B2    3/2006 Gable et al.
(Continued)

FOREIGN PATENT DOCUMENTS

CN    106297772 A    1/2017
CN    106531172 A    3/2017
(Continued)

OTHER PUBLICATIONS

Combined Search and Examination Report under Sections 17 and 18(3), UKIPO, Application No. GB1801659.2, dated Jul. 26, 2018.
(Continued)

*Primary Examiner* — Jason R Kurr
(74) *Attorney, Agent, or Firm* — Jackson Walker L.L.P.

(57) ABSTRACT

A method of determining whether a sound has been generated by a loudspeaker comprises receiving an audio signal representing at least a part of the sound. The audio signal is separated into different frequency bands. The signal content of different frequency bands are compared. Based on said comparison, frequency-based variations in signal content indicative of use of a loudspeaker are identified.

16 Claims, 7 Drawing Sheets

(51) Int. Cl.
    G10L 25/51    (2013.01)
    G10L 17/00    (2013.01)
    G06F 21/32    (2013.01)
    H04R 3/04     (2006.01)
    G10L 25/60    (2013.01)
    G10L 25/18    (2013.01)
(52) U.S. Cl.
    CPC .............. *G10L 25/78* (2013.01); *G10L 25/18* (2013.01); *G10L 25/60* (2013.01); *H04R 3/04* (2013.01); *H04R 2430/03* (2013.01)

(56) References Cited

U.S. PATENT DOCUMENTS

| | | | | |
|---|---|---|---|---|
| 8,489,399 | B2* | 7/2013 | Gross | G10L 15/22 |
| | | | | 704/260 |
| 9,171,548 | B2 | 10/2015 | Velius et al. | |
| 9,484,036 | B2* | 11/2016 | Kons | G10L 25/51 |
| 9,646,261 | B2 | 5/2017 | Agrafioti et al. | |
| 10,079,024 | B1* | 9/2018 | Bhimanaik | G10L 25/51 |
| 2002/0194003 | A1 | 12/2002 | Mozer | |
| 2004/0141418 | A1 | 7/2004 | Matsuo et al. | |
| 2005/0171774 | A1 | 8/2005 | Applebaum et al. | |
| 2007/0129941 | A1 | 6/2007 | Tavares | |
| 2008/0071532 | A1 | 3/2008 | Ramakrishnan et al. | |
| 2010/0204991 | A1 | 8/2010 | Ramakrishnan et al. | |
| 2013/0289999 | A1 | 10/2013 | Hymel | |
| 2015/0088509 | A1* | 3/2015 | Gimenez | G10L 17/22 |
| | | | | 704/243 |
| 2016/0234204 | A1* | 8/2016 | Rishi | G06F 21/31 |
| 2017/0169828 | A1 | 6/2017 | Sachdev | |
| 2017/0200451 | A1* | 7/2017 | Bocklet | G10L 17/06 |
| 2017/0231534 | A1 | 8/2017 | Agassy et al. | |
| 2018/0254046 | A1* | 9/2018 | Khoury | G10L 17/02 |
| 2018/0374487 | A1 | 12/2018 | Lesso | |
| 2019/0005963 | A1 | 1/2019 | Alonso et al. | |
| 2019/0005964 | A1 | 1/2019 | Alonso et al. | |

FOREIGN PATENT DOCUMENTS

| | | |
|---|---|---|
| EP | 1701587 A2 | 9/2006 |
| EP | 1928213 A1 | 6/2008 |
| EP | 2660813 A1 | 11/2013 |
| EP | 2860706 A2 | 4/2015 |
| EP | 3016314 A1 | 5/2016 |
| GB | 2499781 A | 9/2013 |
| GB | 2515527 A | 12/2014 |
| GB | 2551209 A | 12/2017 |
| WO | 9834216 A2 | 8/1998 |
| WO | 02/103680 A2 | 12/2002 |
| WO | 2008113024 A1 | 9/2008 |
| WO | 2010066269 A1 | 6/2010 |
| WO | 2013022930 A1 | 2/2013 |
| WO | 2013154790 A1 | 10/2013 |
| WO | 2015163774 A1 | 10/2015 |
| WO | 2016003299 A1 | 1/2016 |
| WO | 2017055551 A1 | 4/2017 |

OTHER PUBLICATIONS

Villalba, J. & Lleida, E., "Preventing replay attacks on speaker verification systems", 2011 Carnahan Conference on Security Technology, Oct. 18, 2011.
International Search Report and Written Opinion of the International Searching Authority, International Application No. PCT/GB2018/053274, dated Jan. 24, 2019.
Beigi, Homayoon, "Fundamentals of Speaker Recognition," Chapters 8-10, ISBN: 978-0-378-77592-0; 2011.
Li, Lantian et al., "A Study on Replay Attack and Anti-Spoofing for Automatic Speaker Verification", Interspeech 2017, Jan. 1, 2017, pp. 92-96.
Li, Zhi et al., "Compensation of Hysteresis Nonlinearity in Magnetostrictive Actuators with Inverse Multiplicative Structure for Preisach Model", IEE Transactions on Automation Science and Engineering, vol. 11, No. 2, Apr. 1, 2014, pp. 613-619.
Partial International Search Report of the International Searching Authority, International Application No. PCT/GB2018/052905, dated Jan. 25, 2019.
Combined Search and Examination Report, UKIPO, Application No. GB1713699.5, dated Feb. 21, 2018.
Combined Search and Examination Report, UKIPO, Application No. GB1713695.3, dated Feb. 19, 2018.
Zhang et al., An Investigation of Deep-Learing Frameworks for Speaker Verification Antispoofing—IEEE Journal of Selected Topics in Signal Processes, Jun. 1, 2017.
Combined Search and Examination Report under Sections 17 and 18(3), UKIPO, Application No. GB1809474.8, dated Jul. 23, 2018.
Wu et al., Anti-Spoofing for text-Independent Speaker Verification: An Initial Database, Comparison of Countermeasures, and Human Performance, IEEE/ACM Transactions on Audio, Speech, and Language Processing, Issue Date: Apr. 2016.
International Search Report and Written Opinion of the International Searching Authority, International Application No. PCT/GB2018/051760, dated Aug. 3, 2018.
International Search Report and Written Opinion of the International Searching Authority, International Application No. PCT/GB2018/051787, dated Aug. 16, 2018.
International Search Report and Written Opinion of the International Searching Authority, International Application No. PCT/GB2018/052907, dated Jan. 15, 2019.
Ajmera, et al,, "Robust Speaker Change Detection," IEEE Signal Processing Letters, vol. 11, No. 8, pp. 649-651, Aug. 2004.
Combined Search and Examination Report under Sections 17 and 18(3), UKIPO, Application No. GB1803570.9, dated Aug. 21, 2018.
International Search Report and Written Opinion of the International Searching Authority, International Application No. PCT/GB2018/051765, dated Aug. 16, 2018.
Combined Search and Examination Report under Sections 17 and 18(3), UKIPO, Application No. GB1801661.8, dated Jul. 30, 2018.
Combined Search and Examination Report under Sections 17 and 18(3), UKIPO, Application No. GB1801663.4, dated Jul. 18, 2018.
Combined Search and Examination Report under Sections 17 and 18(3), UKIPO, Application No. GB1801684.2, dated Aug. 1, 2018.
Combined Search and Examination Report under Sections 17 and 18(3), UKIPO, Application No. GB1719731.0, dated May 16, 2018.
Combined Search and Examination Report, UKIPO, Application No. GB1801874.7, dated Jul. 25, 2018.
Combined Search and Examination Report under Sections 17 and 18(3), UKIPO, Application No. GB1804843.9, dated Sep. 27, 2018.
International Search Report and Written Opinion of the International Searching Authority, International Application No. PCT/GB2018/052906, dated Jan. 14, 2019.
Further Search Report under Sections 17 (6), UKIPO, Application No. GB1719731.0, dated Nov. 26, 2018.
Combined Search and Examination Report, UKIPO, Application No. GB1713697.9, dated Feb. 20, 2018.
Chen et al., "You Can Hear But You Cannot Steal: Defending Against Voice Impersonation Attacks on Smartphones", Proceedings of the International Conference on Distributed Computing Systems, PD: 20170605.

* cited by examiner

DETECTION OF LOUDSPEAKER PLAYBACK

TECHNICAL FIELD

Embodiments described herein relate to methods and devices for detecting when a signal has been played through a loudspeaker.

BACKGROUND

Voice biometrics systems are becoming widely used. In such a system, a user trains the system by providing samples of their speech during an enrolment phase. In subsequent use, the system is able to discriminate between the enrolled user and non-registered speakers. Voice biometrics systems can in principle be used to control access to a wide range of services and systems.

One way for a malicious party to attempt to defeat a voice biometrics system is to obtain a recording of the enrolled user's speech, and to play back the recording in an attempt to impersonate the enrolled user and to gain access to services that are intended to be restricted to the enrolled user.

This is referred to as a replay attack, or as a spoofing attack.

SUMMARY

According to a first aspect of the present invention, there is provided a method of determining whether a sound has been generated by a loudspeaker, the method comprising:
  receiving an audio signal representing at least a part of the sound;
  separating the audio signal into different frequency bands;
  comparing signal content of different frequency bands; and
  based on said comparison, identifying frequency-based variations in signal content indicative of use of a loudspeaker.

The step of comparing signal content of different frequency bands may comprise:
  performing statistical analysis of signal content of different frequency bands to generate statistical metric, and comparing statistical metric for different frequency bands.

The method may further comprise:
  if variations in signal content indicative of use of a loudspeaker are identified, generating a loudspeaker indication output signal.

The method may comprise attempting to detect in the received audio signal features resulting from a non-linearity that is greater at first audio frequencies than at second audio frequencies by:
  separating the received audio signal into a first audio frequency component and a second audio frequency component; and
  analysing the first audio frequency component and the second audio frequency component.

The method may comprise:
  analysing the first audio frequency component and the second audio frequency component to obtain respective metrics; and
  comparing said metrics to identify features resulting from a non-linearity that is greater at first audio frequencies than at second audio frequencies.

Analysing at least one of the first audio frequency component and the second audio frequency component may comprise obtaining a statistical metric relating to sample values of the respective component. The statistical metric may be a measure of an asymmetry of a waveform of the sound. The statistical metric may be a measure of skew of the sample values. The measure of skew may be a Pearson coefficient of skewness; a non-parametric skew; or a quartile skewness coefficient.

The method may comprise:
  obtaining a measure of skew of sample values of the first audio frequency component;
  obtaining a measure of skew of sample values of the second audio frequency component; and
  determining that the received audio signal has features resulting from a non-linearity that is greater at first audio frequencies than at second audio frequencies, if a ratio of the measure of skew of sample values of the first audio frequency component to the measure of skew of sample values of the second audio frequency component exceeds a threshold value.

The method may comprise setting the threshold value. When the received audio signal represents speech, the method may comprise setting the threshold value based on an assumed identify of a speaker. The method may comprise setting the threshold value based on a level of the received signal.

The method may comprise:
  obtaining a measure of skew of sample values of the first audio frequency component;
  obtaining a measure of skew of sample values of the second audio frequency component; and
  determining that the received audio signal has features resulting from a non-linearity that is greater at first audio frequencies than at second audio frequencies, if a difference between the measure of skew of sample values of the first audio frequency component and the measure of skew of sample values of the second audio frequency component exceeds a threshold value.

The method may comprise, before obtaining the statistical metric, removing samples having small sample values. The method may comprise using a non-linear quantiser to remove the samples having small sample values.

The method may comprise, before obtaining the statistical metric, applying a non-linear gain to the sample values. The non-linear gain may be a compression.

In some embodiments, obtaining a statistical metric relating to sample values of the respective component comprises a Cumulative Distribution Function relating to sample values of the respective component. Comparing signal content of different frequency bands may comprise:
  comparing each Cumulative Distribution Function with a respective reference Cumulative Distribution Function for the respective component to obtain a measure of a difference therebetween; and
  comparing said measures of difference obtained for the respective components.

Comparing signal content of different frequency bands may comprise comparing the Cumulative Distribution Functions relating to the respective components.

In some embodiments, the method is for determining whether sound has been generated by a loudspeaker having a known resonant frequency, and comprises:
  attempting to detect in the received audio signal features resulting from a non-linearity that is greater at frequencies below the known resonant frequency than at frequencies above the known resonant frequency.

In some embodiments, the method comprises using a machine learning technique to attempt to detect in the received audio signal the features resulting from a non-linearity that is greater at low audio frequencies than at high audio frequencies. The method may comprise using a neural network for the machine learning technique.

In some embodiments, the method comprises:
receiving a first signal representing the sound;
deriving from the first signal a second signal representing a part of the sound; and
attempting to detect in the second signal the features resulting from a non-linearity that is greater at first audio frequencies than at second audio frequencies.

The second signal may represent speech. More specifically, the second signal may represent voiced speech.

The method may comprise:
receiving the first signal at a voice activity detector; and
deriving the second signal representing speech only if the voice activity detector detects speech in the first signal.

The method may be for use in a voice biometrics system, and may further comprise:
determining that the sound may result from a replay attack on the voice biometrics system, if it is determined that the sound was generated by a loudspeaker.

In that case, the method may comprise:
passing the received audio signal to a voice biometric processing module only if it is determined that the sound was not generated by a loudspeaker.

According to a second aspect of the present invention, there is provided a method of determining whether a sound has been generated by a loudspeaker, the method comprising:
receiving an audio signal representing the sound;
attempting to detect in the received audio signal features resulting from a non-linearity that is characteristic of a loudspeaker; and
if said features are detected, determining that the sound was generated by a loudspeaker.

According to another aspect of the present invention, there is provided a system for determining whether a sound has been generated by a loudspeaker, configured for operating in accordance with a method in accordance with either the first or second aspect.

According to another aspect of the present invention, there is provided a device comprising such a system. The device may comprise a mobile telephone, an audio player, a video player, a mobile computing platform, a games device, a remote controller device, a toy, a machine, or a home automation controller or a domestic appliance.

According to another aspect of the present invention, there is provided a computer program product, comprising a computer-readable tangible medium, and instructions for performing a method according to the first aspect.

According to another aspect of the present invention, there is provided a non-transitory computer readable storage medium having computer-executable instructions stored thereon that, when executed by processor circuitry, cause the processor circuitry to perform a method according to the first aspect.

According to another aspect of the present invention, there is provided a device comprising such a non-transitory computer readable storage medium. The device may comprise a mobile telephone, an audio player, a video player, a mobile computing platform, a games device, a remote controller device, a toy, a machine, or a home automation controller or a domestic appliance.

BRIEF DESCRIPTION OF DRAWINGS

For a better understanding of the present invention, and to show how it may be put into effect, reference will now be made to the accompanying drawings, in which:—

DETAILED DESCRIPTION OF EMBODIMENTS

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

The methods described herein can be implemented in a wide range of devices and systems, for example a mobile telephone, an audio player, a video player, a mobile computing platform, a games device, a remote controller device, a toy, a machine, or a home automation controller or a domestic appliance. However, for ease of explanation of one embodiment, an illustrative example will be described, in which the implementation occurs in a smartphone.

Figure 1:
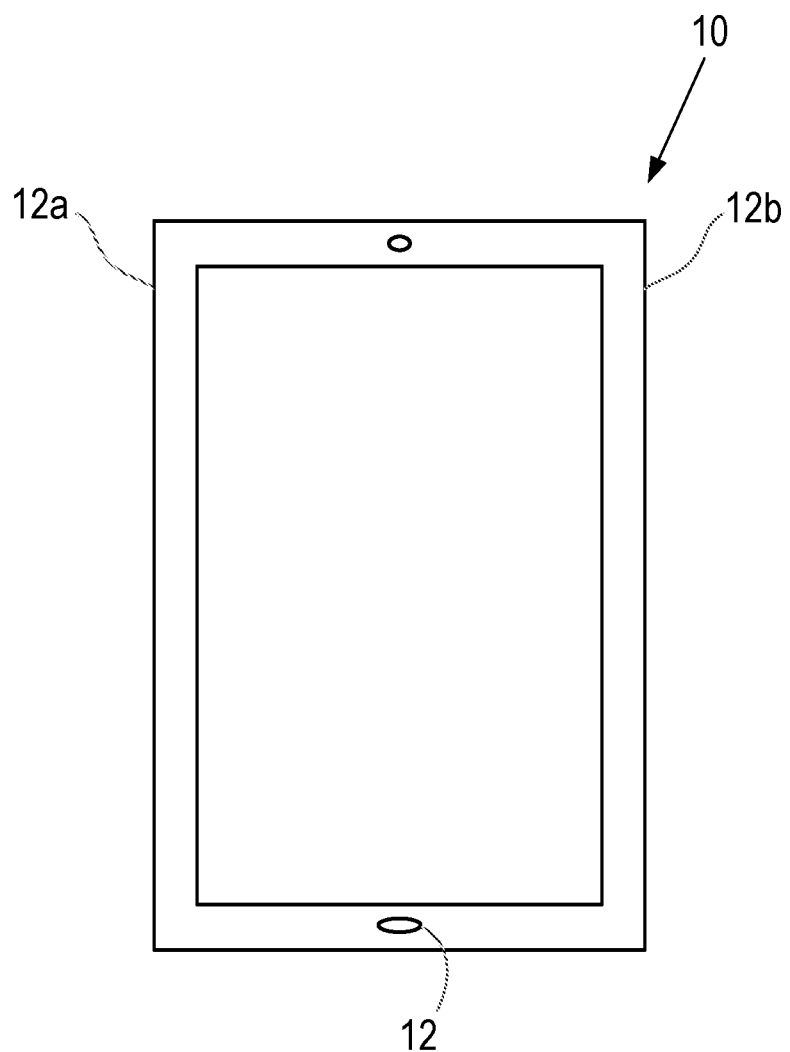
FIG. 1 illustrates a smartphone.

FIG. 1 illustrates a smartphone 10, having a microphone 12 for detecting ambient sounds. In normal use, the microphone is of course used for detecting the speech of a user who is holding the smartphone 10 close to their face.

Figure 2:
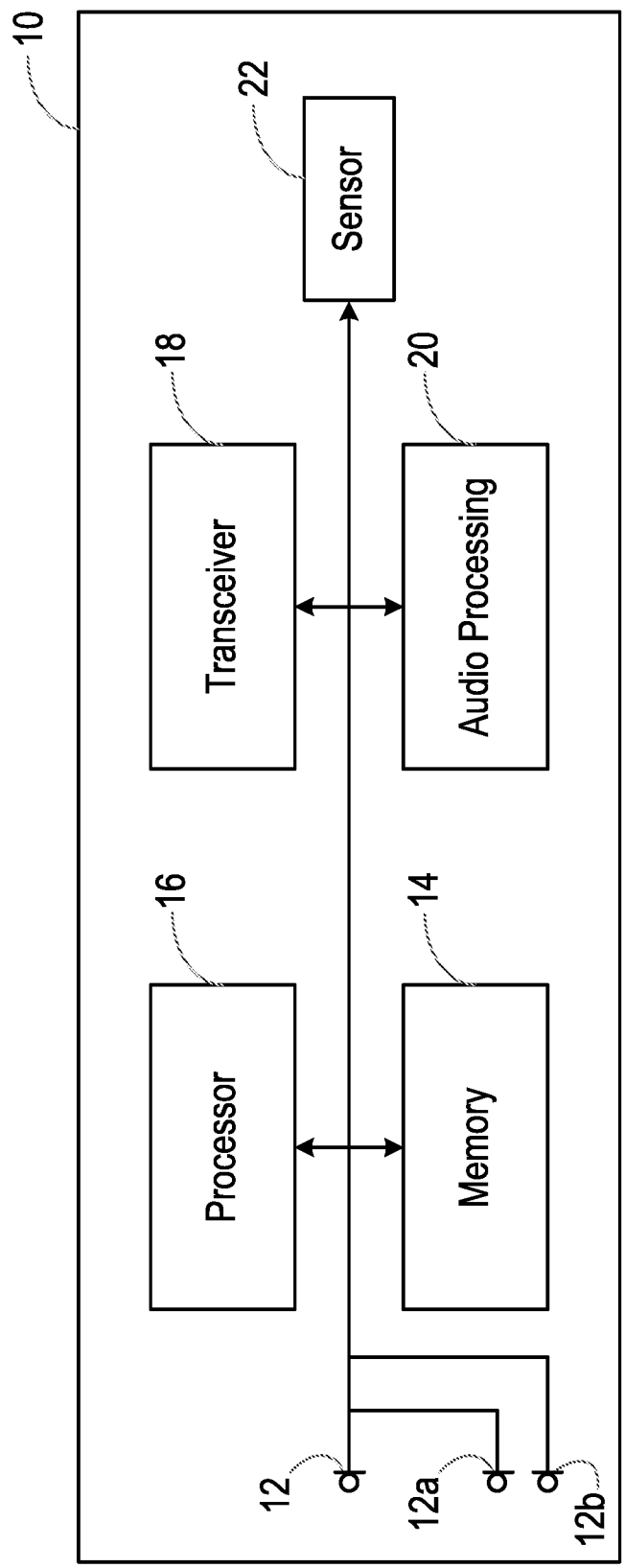
FIG. 2 is a schematic diagram, illustrating the form of the smartphone.

FIG. 2 is a schematic diagram, illustrating the form of the smartphone 10.

Specifically, FIG. 2 shows various interconnected components of the smartphone 10. It will be appreciated that the smartphone 10 will in practice contain many other components, but the following description is sufficient for an understanding of the present invention.

Thus, FIG. 2 shows the microphone 12 mentioned above. In certain embodiments, the smartphone 10 is provided with multiple microphones 12, 12a, 12b, etc.

FIG. 2 also shows a memory 14, which may in practice be provided as a single component or as multiple components. The memory 14 is provided for storing data and program instructions.

FIG. 2 also shows a processor 16, which again may in practice be provided as a single component or as multiple components. For example, one component of the processor 16 may be an applications processor of the smartphone 10.

FIG. 2 also shows a transceiver 18, which is provided for allowing the smartphone 10 to communicate with external networks. For example, the transceiver 18 may include circuitry for establishing an internet connection either over a WiFi local area network or over a cellular network.

FIG. 2 also shows audio processing circuitry 20, for performing operations on the audio signals detected by the microphone 12 as required. For example, the audio processing circuitry 20 may filter the audio signals or perform other signal processing operations.

In this embodiment, the smartphone 10 is provided with voice biometric functionality, and with control functionality. Thus, the smartphone 10 is able to perform various functions in response to spoken commands from an enrolled user. The biometric functionality is able to distinguish between spoken commands from the enrolled user, and the same commands when spoken by a different person. Thus, certain embodiments of the invention relate to operation of a smartphone or another portable electronic device with some sort of voice operability, for example a tablet or laptop computer, a games console, a home control system, a home entertainment system, an in-vehicle entertainment system, a domestic appliance, or the like, in which the voice biometric functionality is performed in the device that is intended to carry out the spoken command. Certain other embodiments relate to systems in which the voice biometric functionality is performed on a smartphone or other device, which then transmits the commands to a separate device if the voice biometric functionality is able to confirm that the speaker was the enrolled user.

In some embodiments, while voice biometric functionality is performed on the smartphone 10 or other device that is located close to the user, the spoken commands are transmitted using the transceiver 18 to a remote speech recognition system, which determines the meaning of the spoken commands. For example, the speech recognition system may be located on one or more remote server in a cloud computing environment. Signals based on the meaning of the spoken commands are then returned to the smartphone 10 or other local device.

Figure 3:
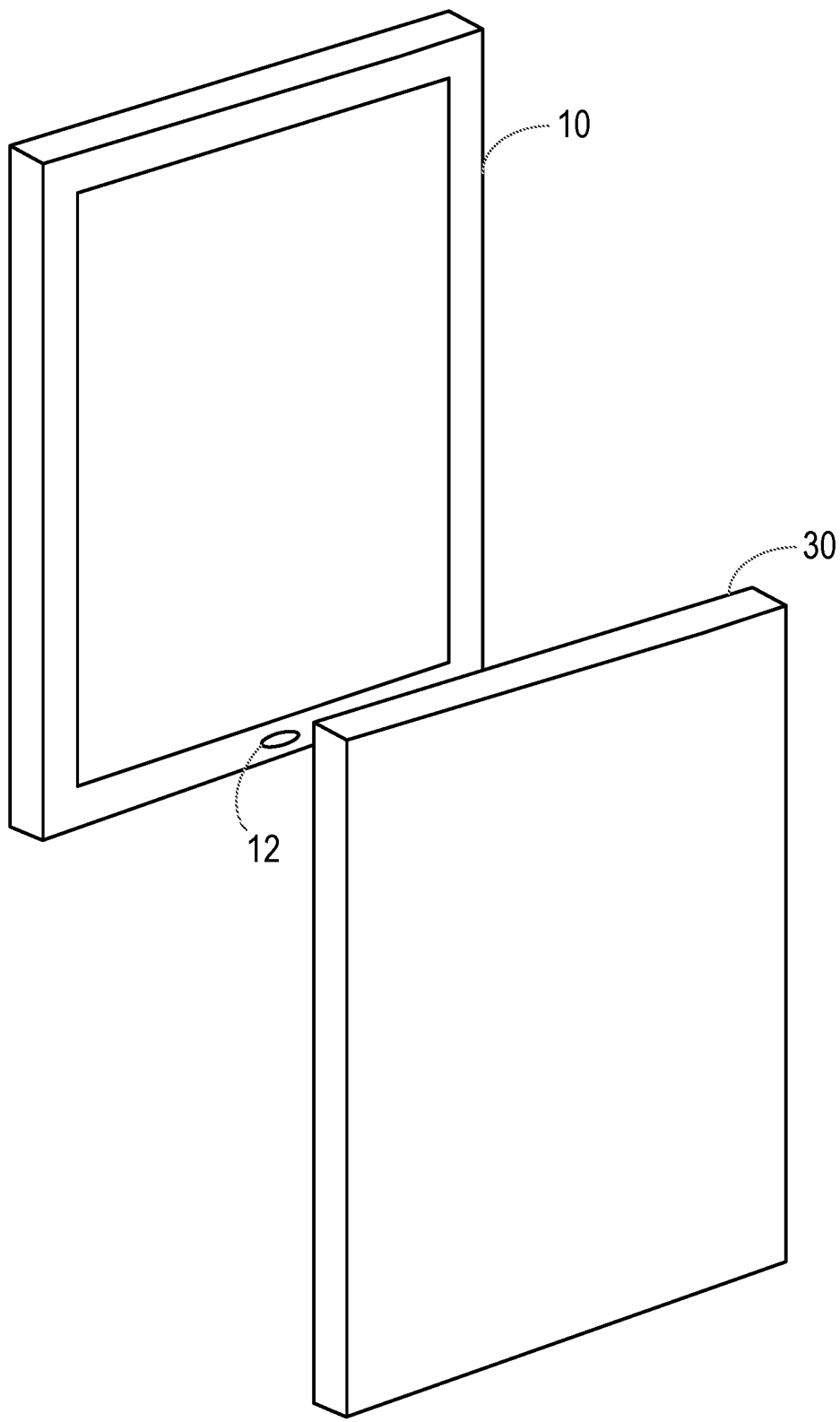
FIG. 3 illustrates a situation in which a replay attack is being performed.

FIG. 3 shows an example of a situation in which a replay attack is being performed. Thus, in FIG. 3, the smartphone 10 is provided with voice biometric functionality. In this example, the smartphone 10 is in the possession, at least temporarily, of an attacker, who has another smartphone 30. The smartphone 30 has been used to record the voice of the enrolled user of the smartphone 10. The smartphone 30 is brought close to the microphone inlet 12 of the smartphone 10, and the recording of the enrolled user's voice is played back. If the voice biometric system is unable to detect that the enrolled user's voice that it detects is a recording, the attacker will gain access to one or more services that are intended to be accessible only by the enrolled user.

It is known that smartphones, such as the smartphone 30, are typically provided with loudspeakers that are of relatively low quality due to size constraints. Thus, the recording of an enrolled user's voice played back through such a loudspeaker will not be a perfect match with the user's voice, and this fact can be used to identify replay attacks. For example, loudspeakers may have certain frequency-dependent characteristics, and if these frequency-dependent characteristics can be detected in a speech signal that is received by the voice biometrics system, it may be considered that the speech signal has resulted from a replay attack.

Although FIG. 3 illustrates one possible use of the disclosed method of analysis of an audio signal, the method is applicable more generally to any system in which it is desirable to determine whether a detected sound was played through a loudspeaker.

In this example, the method uses the fact that a typical loudspeaker has a non-linearity that is dependent on frequency. This contrasts with, for example, a microphone, which may have a non-linearity that is substantially independent of the frequency.

Figure 4:
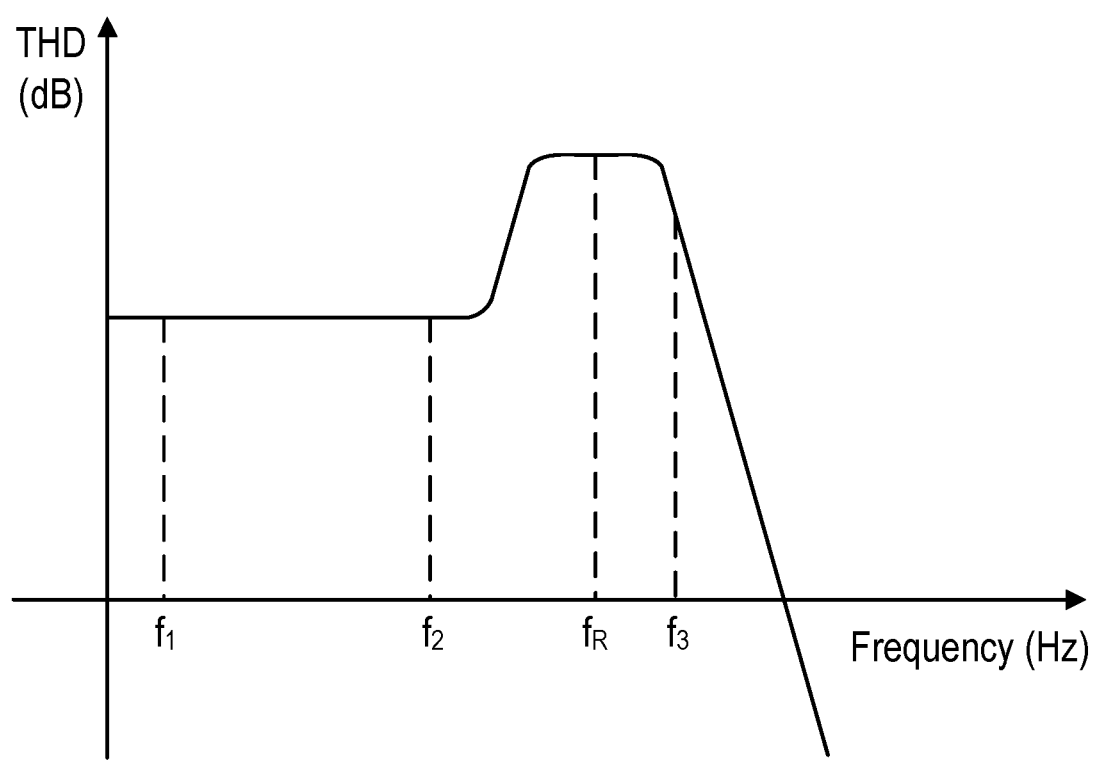
FIG. 4 illustrates a characteristic of a loudspeaker.

FIG. 4 illustrates the non-linearity characteristic of a typical loudspeaker. Specifically, FIG. 4 shows the variation of the total harmonic distortion (THD) with frequency.

At relatively low frequencies, below the resonant frequency $f_R$ of the loudspeaker, for example in the range $f_1$ to $f_2$, the THD is generally constant. The loudspeaker has a large THD at the resonant frequency, and then falls away with increasing frequency, for example for frequencies of $f_3$ and higher.

This non-linearity characteristic can be used to detect when a received sound has been played through a loudspeaker.

Specifically, as the non-linearity characteristic is frequency dependent, the effects of the non-linearity can be detected in different frequency bands, in order to identify whether the received signal results from a sound that has been played through a loudspeaker.

Figure 5:
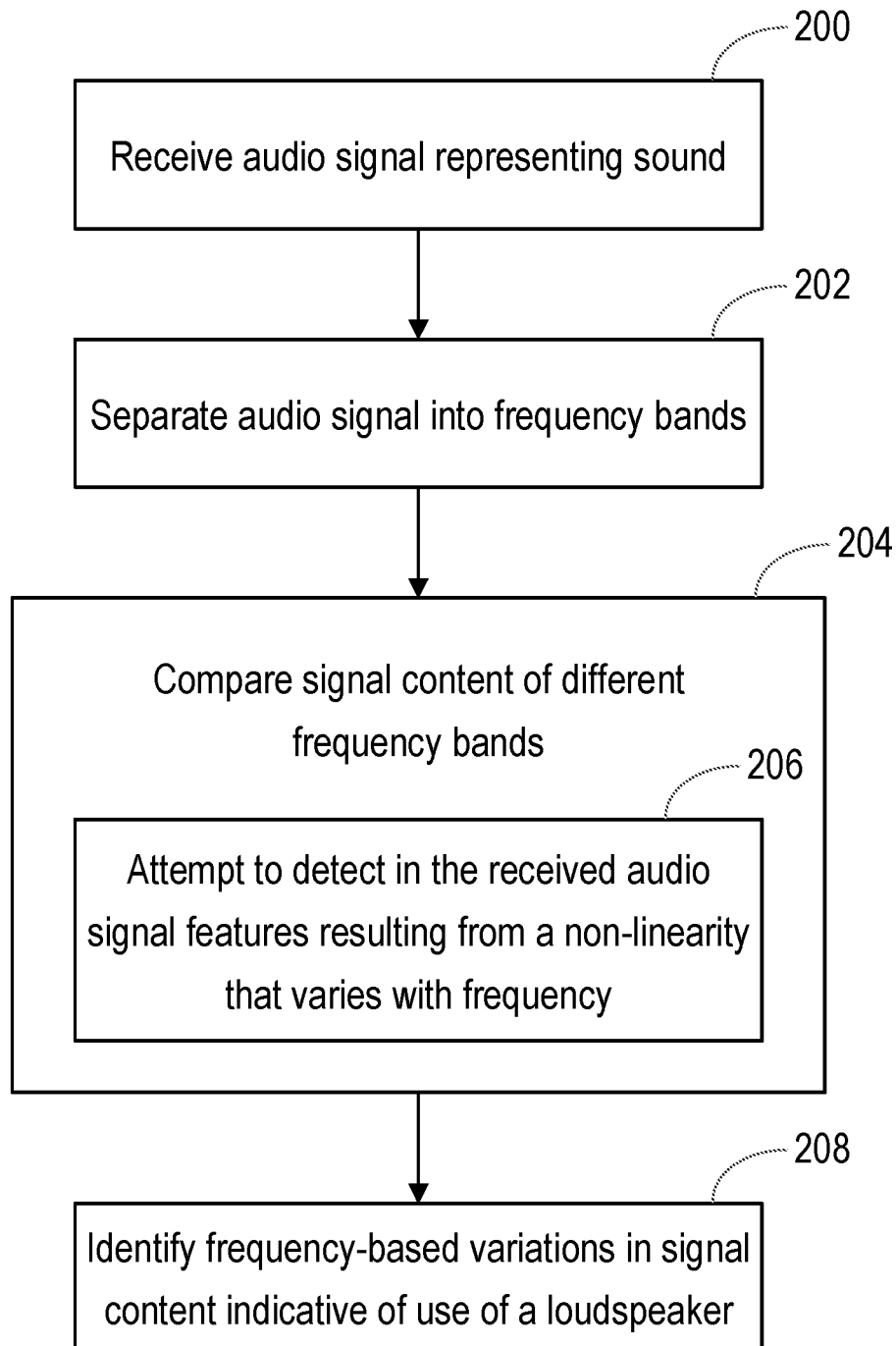
FIG. 5 is a flow chart illustrating a method of analysing an audio signal.
Figure 6:
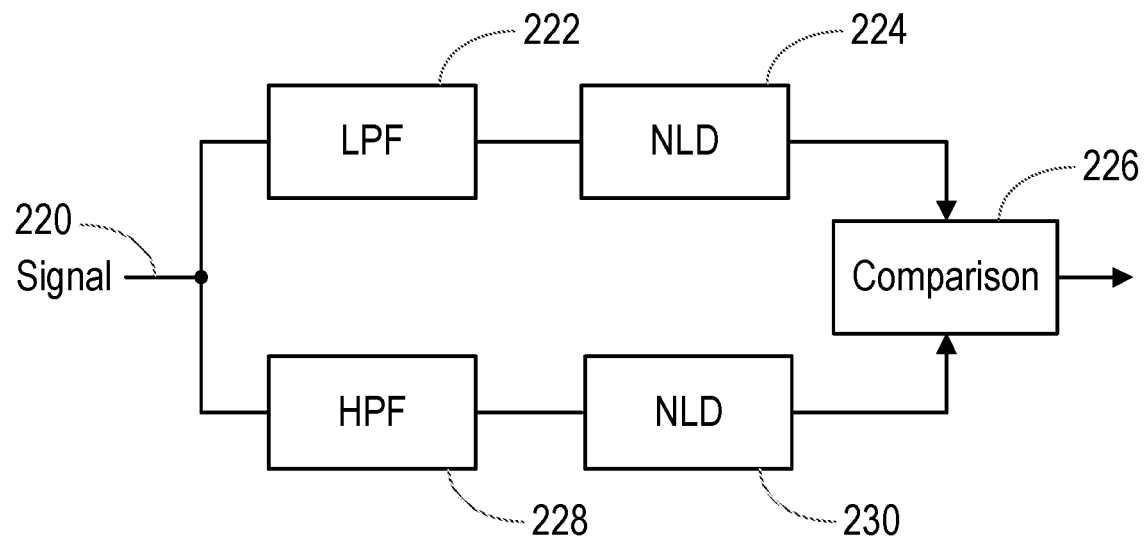
FIG. 6 is a block diagram illustrating an analysis system.

FIG. 5 is a flow chart illustrating the method of analysis, and FIG. 6 is a block diagram illustrating the basic form of an analysis system.

At step 200 of the method, an audio signal representing a sound is received at an input 220 of the system.

The signal received at the input 220 may be received directly from a microphone such as the microphone 12, or may have been subject to some initial pre-processing. Thus, if a first signal is received representing the sound, a second signal may be derived from the first signal representing a part of the sound. Then the system may attempt to detect in the second signal the features resulting from a non-linearity that is greater at some frequencies than at others.

For example, the received signal may be pre-processed so that the second signal represents a speech component of the sound. More specifically, the received signal may be pre-processed so that the second signal represents voiced speech.

The first signal may be received at a voice activity detector, and the second signal may be derived only if the voice activity detector detects speech in the first signal.

At step 202, the received signal is separated into two or more frequency bands. FIG. 6 shows the signal being passed to a first filter 222 in the form of a low-pass filter, and also being passed to a second filter 228 in the form of a high-pass filter. Preferably, the cut-off frequency of the low-pass filter is chosen to be below the resonant frequency of any loudspeaker that would be expected to be used. Similarly, preferably the cut-off frequency of the high-pass filter is chosen to be significantly above the resonant frequency of any loudspeaker that would be expected to be used. This will have the effect that the non-linearity of the loudspeaker, and hence the detectable effect on the received signal, will be greater at low audio frequencies than at high audio frequencies.

In other embodiments, the first filter 222 and the second filter 228 are both band-pass filters, with their respective pass bands being chosen so that they are spaced apart, meaning that the non-linearity of the loudspeaker, and hence the detectable effect on the received signal, will be different in the two pass bands.

In other embodiments, more than two filters are provided, and again these may be band-pass filters, with their respective pass bands being spaced apart. The use of three or more frequency bands improves the probability that the non-linearity of the loudspeaker, and hence the detectable effect on the received signal, will be different in the pass bands, even though the aim is to detect the presence of an unknown loudspeaker having a non-linearity characteristic that by definition cannot be known in advance.

Thus, in step 204, the signal content of the different frequency bands is examined. In the example shown in FIG. 6, the outputs of the filters 222, 228 are passed to respective non-linearity detector (NLD) blocks 224, 230. Thus, in this example, as shown at step 206, the system attempts to detect in the received audio signal features that result from a non-linearity.

More specifically, the system attempts to detect in the received audio signal features that result from a non-linearity that varies with frequency, for example being greater at low audio frequencies than at high audio frequencies.

The Non-Linearity Detectors (NLD) 224, 230 can take many forms, but one effect of non-linearity on a received signal is to increase the asymmetry of the signal. That is, if a signal contains a large number of samples, and the sample values are a mixture of positive and negative values, one effect of the non-linearity will be to introduce new sample values that are the square of values in the input signal. These squared values will all be positive, and so their presence will increase the proportion of positive values in the output of the non-linearity.

Thus, one form of a simple form Non-Linearity Detector (NLD) measures the asymmetry of the wave form in each of the two or more frequency bands selected by the filters 222, 228.

Step 206 of the method may comprise analysing the two or more frequency components to obtain respective metrics, and then comparing said metrics to identify features resulting from a non-linearity that is greater in one of the frequency bands than the other.

More specifically, analysing the two or more frequency components may comprise obtaining a statistical metric relating to sample values of the respective component. The statistical metric may be a measure of an asymmetry of a waveform of the sound. More specifically, the statistical metric may be a measure of skew of the sample values.

Figure 7:
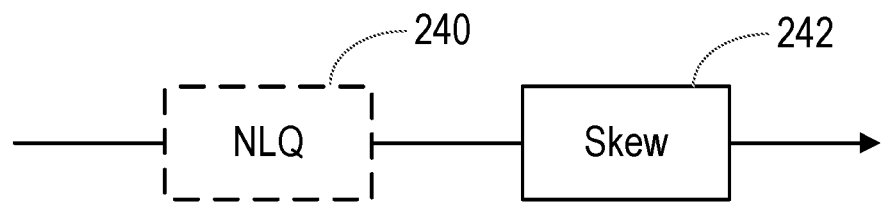
FIG. 7 illustrates in more detail a part of the system of FIG. 6.

FIG. 7 shows one possible implementation of a NLD. In this implementation, an optional non-linear gain is applied to the relevant frequency component of the received signal. The non-linear gain can be compression or, as shown in FIG. 7, a non-linear quantiser 240, which acts to remove small-valued samples, so that the larger samples have a greater effect on the subsequent determination. The resulting signal is passed to a block 242 for measuring the skew of the signal in order to obtain a statistical metric for the relevant frequency band.

The skew measuring block 242 may for example form as a measure of the skew a Pearson coefficient of skewness; a non-parametric skew; or a quartile skewness coefficient.

The non-parametric skew Sk may be:

$$Sk = \frac{(\mu - v)}{\sigma}$$

where $\mu$ is the mean of the sample values, v is the median of the sample values, and $\sigma$ is the standard deviation of the sample values.

Alternatively, a non-parametric skew in which the standard deviation is replaced by the mean absolute deviation may be used.

The quartile skewness coefficient Sq may be:

$$Sq = \frac{(Q3 + Q1 - 2 \cdot Q2)}{(Q3 - Q1)}$$

where Q1, Q2, and Q3 are the first, second and third quartile values, respectively.

An alternative form of NLD examines a Cumulative Distribution Function derived from the samples in the respective frequency band.

Figure 8:
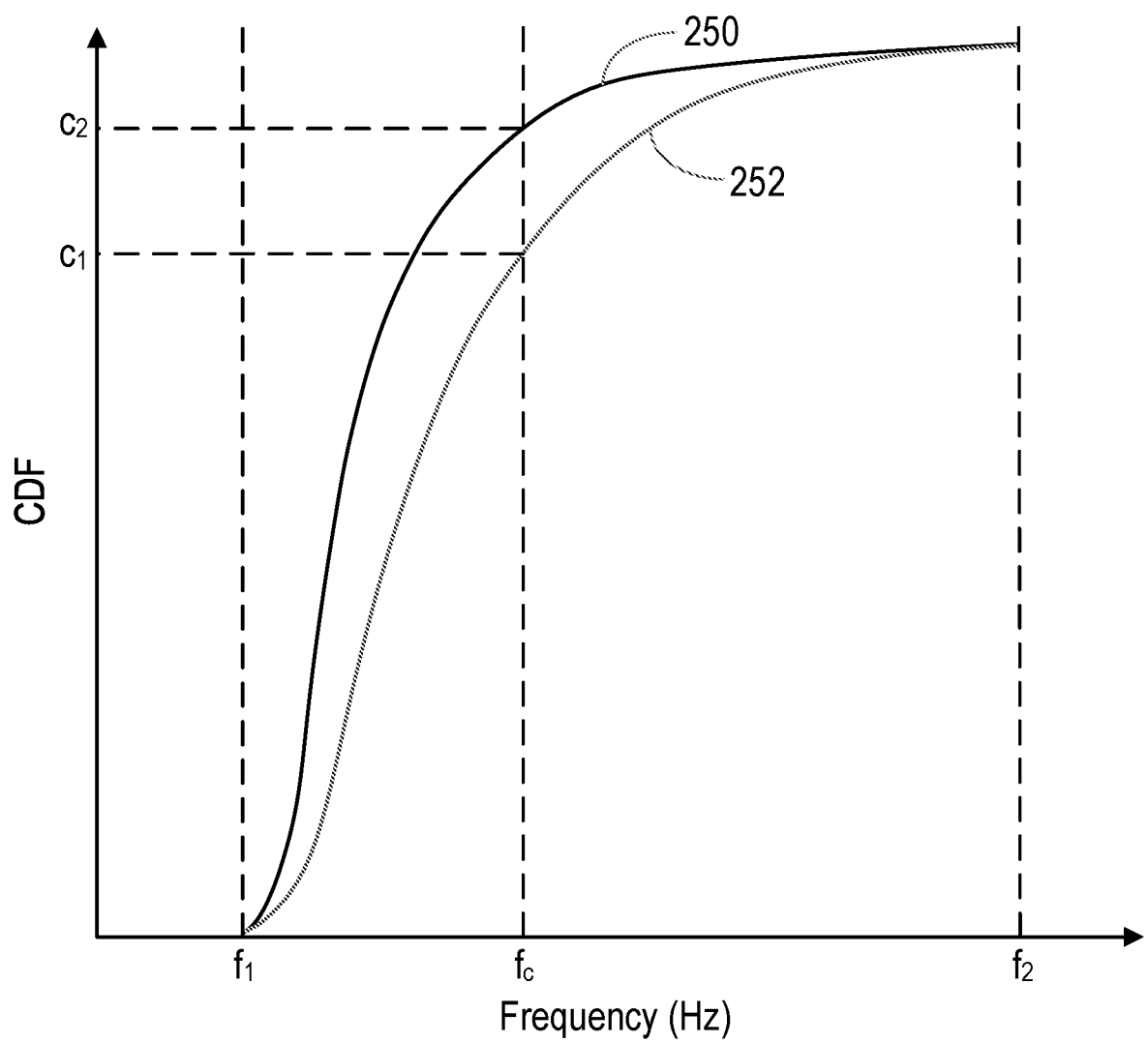
FIG. 8 illustrates an embodiment of the system of FIG. 6.

FIG. 8 illustrates the type of Cumulative Distribution Function that is used.

Specifically, FIG. 8 shows the Cumulative Distribution Function obtained for a first filter pass band that extends from a lower frequency $f_1$ to an upper frequency $f_2$. For example, the Cumulative Distribution Function may be obtained for the signals that are passed by one of the filters 222, 228. The curve 250 then shows the percentage of the frames in which the fundamental frequency of the signal is lower than the relevant frequency. Thus, by way of illustration, the Cumulative Distribution Function 250 shows that a percentage $c_2$ of the frames have the fundamental frequency below the frequency $f_c$.

In one example, a measure of non-linearity is then obtained by comparing the Cumulative Distribution Function 250 with a reference Cumulative Distribution Function 252. The reference Cumulative Distribution Function 252 may for example have a Lorentzian distribution.

The comparison between the Cumulative Distribution Function 250 and the reference Cumulative Distribution Function 252 may be achieved by means of a vertical distance calculation. Thus, as mentioned above, the Cumulative Distribution Function 250 shows that a percentage $c_2$ of the frames have the fundamental frequency below the frequency $f_c$. Similarly, the reference Cumulative Distribution Function 252 shows that a percentage $c_1$ of the frames have the fundamental frequency below the frequency $f_c$. Thus, the vertical distance $(c_2-c_1)$ can be calculated at the frequency $f_c$. The same calculation can be performed for all frequencies within the frequency band that extends from $f_1$ to $f_2$. This can then be used to form a measure of the non-linearity of the signal within the frequency band from $f_1$ to $f_2$. For example, a metric that represents the non-linearity of the signal within the relevant frequency band can be obtained by finding the maximum vertical distance between the Cumulative Distribution Function 250 and the reference Cumulative Distribution Function 252 across the frequency band from $f_1$ to $f_2$.

The same steps can be performed for the signals that are passed by the other one of the filters 222, 228, in order to obtain a statistical metric that represents the non-linearity of the signal within the relevant frequency band.

After performing a statistical analysis of the signal content of the different frequency bands to generate respective statistical metrics, in step 208 these metrics are passed to the comparison block 226 shown in FIG. 6

The comparison block 226 compares the statistical metrics obtained for the different frequency bands.

For example, if two frequency components are separated by the filters 222, 228, the metrics obtained for these two frequency bands can be compared to obtain a value for the ratio of the two metrics.

That is, if the metric is φ1 for a first frequency band and φ2 for a second frequency band, a ratio φ1/φ2 can be formed. This ratio can then be compared with one or more threshold value. It can be determined that the signal may have been played through a loudspeaker if the ratio is above an upper threshold and/or if the ratio is below a lower threshold.

If more than two frequency bands are chosen, the metrics for these frequency bands can for example be compared in pairs. That is, if the metric is φ1 for a first frequency band, φ2 for a second frequency band and φ3 for a third frequency band, three ratios φ1/φ2, φ1/φ3, and φ2/φ3 can be formed. These ratio can then all be compared with the one or more threshold value.

If the first frequency band and the second frequency band are chosen such that they are likely to be significantly below the resonant frequency of a loudspeaker and significantly above the resonant frequency of the loudspeaker, then it could be determined that the received audio signal has features resulting from a non-linearity that is greater at low audio frequencies than at high audio frequencies, if a ratio of the measure of skew of sample values of the low audio frequency component to the measure of skew of sample values of the high audio frequency component exceeds a threshold value.

For example, the typical value for the ratio might be 1.5:1. Therefore, to provide a good degree of discrimination, the threshold value for the ratio might be set to be 1.3:1.

However, it is also known that speech is typically somewhat asymmetric, and the speech of some speakers is naturally more asymmetric than others. Thus, if the system has access to information about the purported identity of the speaker, as would typically be the case in a speaker verification system for example, the threshold value for the ratio might be adapted to take account of that information. For example, for a speaker with a low degree of natural asymmetry the threshold value for the ratio may be set to a lower value than normal. For a speaker with a high degree of natural asymmetry the threshold value for the ratio may be set to a higher value than normal.

Similarly, the non-linearity will vary with the sound pressure level. The threshold value for the ratio can therefore be adjusted based on the signal level. If the detected sound is quiet, the non-linearity will have a relatively small effect on the received signal, and so it will be advantageous to set a lower than normal threshold value for the ratio. By contrast, if the detected sound is loud, the non-linearity will have a relatively large effect on the received signal, and so it will be possible to set a higher than normal threshold value for the ratio.

Although reference is made here to determining the ratio of the metrics obtained for the different frequency bands, it will be appreciated that it is also possible to form the difference between the metrics (such as the measures of the skew of the sample values of the two frequency component), and to compare this difference with a threshold value.

An embodiment was described above, in which Cumulative Distribution Functions are obtained from the signals in multiple frequency bands, and are compared with respective reference Cumulative Distribution Functions, in order to form respective measures of non-linearity for the frequency bands. These measures of non-linearity for the different frequency bands can then be compared with each other.

A further possibility is to obtain respective Cumulative Distribution Functions from the signals in multiple frequency bands, and to compare those Cumulative Distribution Functions with each other directly in the comparison block 226. For example, the comparison can involve finding a maximum vertical distance between the Cumulative Distribution Functions, as described with reference to FIG. 8 and the comparison between a Cumulative Distribution Function and a reference Cumulative Distribution Functions.

If the difference between the Cumulative Distribution Functions relating to the signals in multiple frequency bands (for example expressed in terms of the vertical distance between them) exceeds a threshold value, then this may be used by the comparison block 226 as an indication that the sound was generated by a loudspeaker.

If the comparison block 226 determines that the sound was generated by a loudspeaker, it generates a loudspeaker indication output signal. This can be supplied to any subsequent processing block, as required. In the case where the analysis is used to determine whether a received audio signal is part of a speaker recognition or speech recognition system, the output signal can be used to control the actions taken by the remainder of that system. For example, in the case of a voice biometrics system, it may be determined that the sound may result from a replay attack on the voice biometrics system, if it is determined that the sound was generated by a loudspeaker. In that case, the received audio signal may be passed to a voice biometric processing module only if it is determined that the sound was not generated by a loudspeaker. Thus, in the speaker recognition system, a decision that the received audio signal contains the speech of an enrolled user can be nullified if the comparison block 226 determines that the received audio signal was generated in response to sound played through a loudspeaker.

Reference was made above to obtaining explicit metrics relating to the two or more frequency bands, and comparing those metrics to identify frequency-based variations in signal content that are indicative of use of a loudspeaker. However, it is also possible to use a machine learning technique to attempt to detect in the received audio signal the features resulting from a non-linearity that varies with frequency, for example being greater at low audio frequencies than at high audio frequencies. The machine learning may for example use a neural network.

The data that is fed to the machine learning technique can for example be the raw frequency data, or can be probability data relating to the signals (for example the cumulative distribution function of the sample values in each of the frequency bands).

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A method of determining whether a sound has been generated by a loudspeaker, the method comprising:
   receiving an audio signal representing at least a part of the sound;
   separating the received audio signal into a first audio frequency component containing first audio frequencies and a second audio frequency component containing second audio frequencies;
   obtaining a first statistical metric relating to sample values of the first audio frequency component and obtaining a second statistical metric relating to sample values of the second audio frequency component; and
   based on said first statistical metric and said second statistical metric, determining whether said sound is indicative of use of a loudspeaker by detecting features resulting from a non-linearity that is greater at said first audio frequencies than at said second audio frequencies.

2. A method according to claim 1, further comprising:
   if said features indicative of use of a loudspeaker are identified, generating a loudspeaker indication output signal.

3. A method according to claim 1, wherein at least one of the first statistical metric and the second statistical metric is a measure of an asymmetry of a waveform of the sound.

4. A method according to claim 1, wherein at least one of the first statistical metric and the second statistical metric is a measure of skew of the sample values.

5. A method according to claim 1, comprising:
   obtaining a measure of skew of sample values of the first audio frequency component;
   obtaining a measure of skew of sample values of the second audio frequency component; and
   determining that the received audio signal has features resulting from a non-linearity that is greater at first audio frequencies than at second audio frequencies, if a difference between the measure of skew of sample values of the first audio frequency component and the measure of skew of sample values of the second audio frequency component exceeds a threshold value.

6. A method according to claim 1, wherein obtaining the first statistical metric and obtaining the second statistical metric relating to sample values of the respective component comprises obtaining a first Cumulative Distribution Function relating to sample values of the first component and obtaining a second Cumulative Distribution Function relating to sample values of the second component.

7. A method according to claim 6, wherein attempting to detect features resulting from a non-linearity that is greater at said first audio frequencies than at said second audio frequencies comprises:
   comparing each Cumulative Distribution Function with a respective reference Cumulative Distribution Function for the respective component to obtain a measure of a difference therebetween; and
   comparing said measures of difference obtained for the respective components.

8. A method according to claim 6, wherein comparing signal content of different frequency bands comprises comparing the Cumulative Distribution Functions relating to the respective components.

9. A method according to claim 1, comprising using a machine learning technique to attempt to detect in the received audio signal the features resulting from a non-linearity that is greater at low audio frequencies than at high audio frequencies.

10. A method according to claim 1, comprising:
    receiving a first signal representing the sound;
    deriving from the first signal a second signal representing a part of the sound; and
    attempting to detect in the second signal the features resulting from a non-linearity that is greater at first audio frequencies than at second audio frequencies.

11. A method according to claim 10, wherein the second signal represents speech.

12. A method according to claim 11, wherein the second signal represents voiced speech.

13. A method according to claim 10, comprising:
    receiving the first signal at a voice activity detector; and
    deriving the second signal representing speech only if the voice activity detector detects speech in the first signal.

14. A method according to claim 1, for use in a voice biometrics system, further comprising:
    determining that the sound may result from a replay attack on the voice biometrics system, if it is determined that the sound was generated by a loudspeaker.

15. A system for determining whether a sound has been generated by a loudspeaker, the system comprising an input for receiving an audio signal representing at least a part of the sound; and a processor, and the system being configured for:
    receiving the audio signal representing at least a part of the sound;
    separating the received audio signal into a first audio frequency component containing first audio frequencies and a second audio frequency component containing second audio frequencies;
    obtaining a first statistical metric relating to sample values of the first audio frequency component and obtaining a second statistical metric relating to sample values of the second audio frequency component; and
    based on said first statistical metric and said second statistical metric, determining whether said sound is indicative of use of a loudspeaker by detecting features resulting from a non-linearity that is greater at said first audio frequencies than at said second audio frequencies.

16. A computer program product, comprising a non-transitory computer-readable medium having stored thereon instructions, the instructions, when read and executed by a processor, for performing a method of determining whether a sound has been generated by a loudspeaker, the method comprising:

receiving an audio signal representing at least a part of the sound;

separating the received audio signal into a first audio frequency component containing first audio frequencies and a second audio frequency component containing second audio frequencies;

obtaining a first statistical metric relating to sample values of the first audio frequency component and obtaining a second statistical metric relating to sample values of the second audio frequency component; and based on said first statistical metric and said second statistical metric, determining whether said sound is indicative of use of a loudspeaker by detecting features resulting from a non-linearity that is greater at said first audio frequencies than at said second audio frequencies.

* * * * *